Oct. 13, 1959   R. D. GAMBRILL   2,908,861
CAPACITANCE SENSING APPARATUS
Filed June 6, 1955
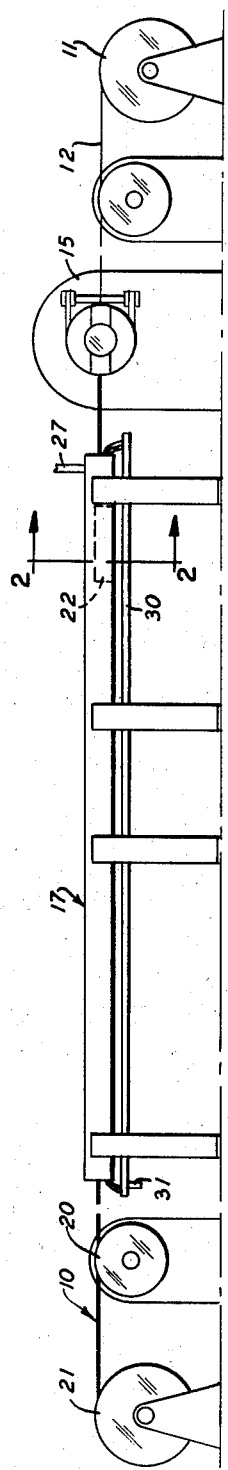
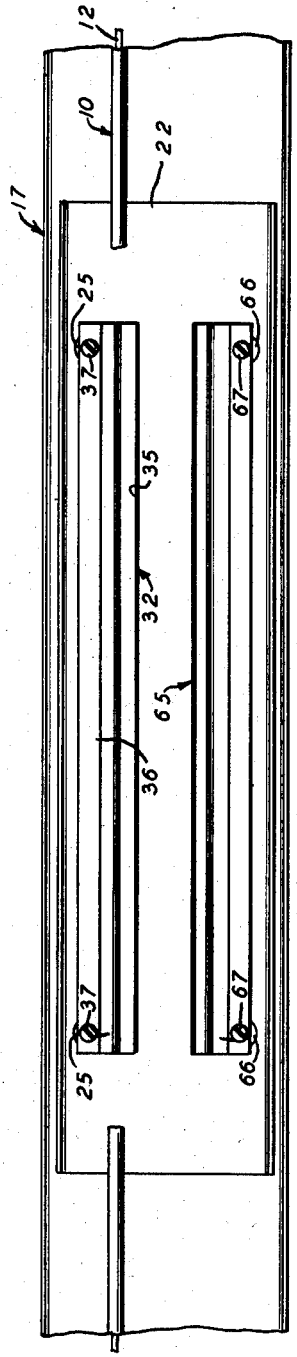
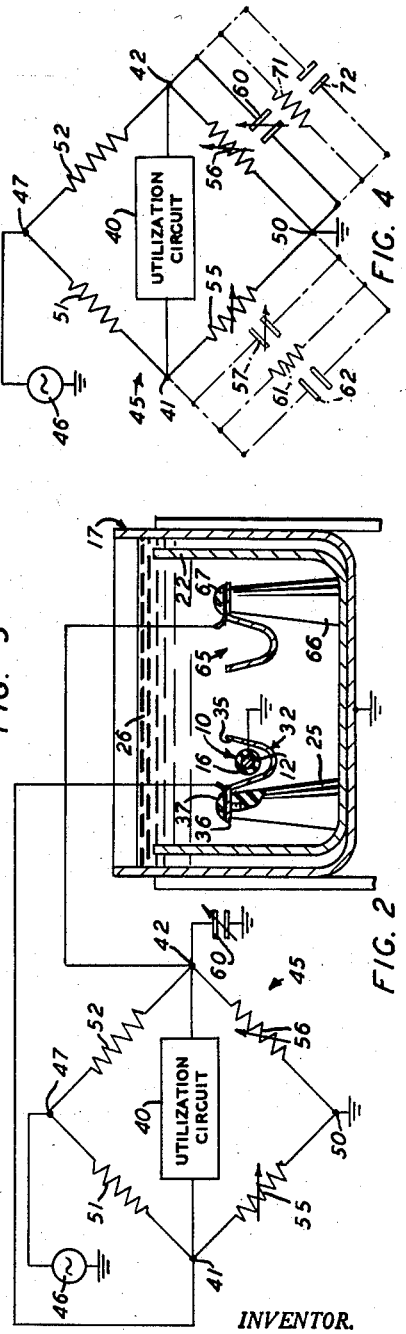
INVENTOR.
R. D. GAMBRILL
BY
ATTORNEY United States Patent Office 2,908,861
Patented Oct. 13, 1959

2,908,861

CAPACITANCE SENSING APPARATUS

Richard D. Gambrill, Idlewylde, Md., assignor to Western Electric Company, Incorporated, New York, N.Y., a corporation of New York Application June 6, 1955, Serial No. 513,502

9 Claims. (Cl. 324—61)

This invention relates to capacitance sensing apparatus, and more particularly to apparatus for continuously sensing the unit-length capacitance of elongated, insulated electrical conductors.

In recent years several apparatus have been devised to either continuously monitor the capacitance of electrical conductors around which plastics coverings have been extruded, or to control the extrusion process to obtain an insulated conductor which has constant unit-length capacitance along its length. In such devices the conductor, after having an insulated covering extruded thereon, is passed through an elongated trough through which a cooling liquid is passed to cool and solidify the insulation before being wound on a takeup reel. An electrode is placed within the trough in order to form a capacitor with the conductor in which the dielectric of the capacitance is the insulation around the conductor.

In the past all such electrodes have had the configuration of a trough which is submerged beneath the level of the liquid in the cooling trough and through which the conductor is passed. Since these electrodes are insulated from the cooling trough, a finite value of electrical resistance, due to the resistance of the liquid, is placed between the electrode and the trough which is at ground potential. The resistance formed thereby necessarily has a finite value of shunt capacitance accompanying it.

The capacitor formed by the electrode and the electrical conductor is placed, generally, in an arm of a balancing bridge, such as a Wheatstone bridge, and balanced against a standard capacitor. The introduction of the extraneous resistance and capacitance by virtue of the mounting of the electrode within the trough places electrical components in the bridge, which result in error when balancing the bridge. This error arises because not only is the capacitance due to the insulated conductor under consideration placed in the bridge circuit, but these extraneous electrical components are also placed therein.

An object, therefore, of this invention is to provide new and improved capacitor sensing apparatus.

Another object of this invention is to provide new and improved apparatus for continuously sensing the unit-length capacitance of elongated, insulated electrical conductors.

Still another object of this invention is to provide new and improved apparatus for compensating for any electrical unbalance introduced by mounting an electrode within a cooling trough or the like.

Apparatus for sensing variations in the covering of covered wire, illustrating certain features of the invention, may include an elongated trough through which the wire is passed, means for maintaining liquid having an effective electrical resistance within the trough, a first electrode mounted within the liquid in the path of the wire for forming a capacitor with the wire wherein the plastic covering is the dielectric thereof and a second electrode mounted within the liquid and having a configuration such as to compensate for any electrical unbalance caused by the first electrode.

These and other objects and features of the invention will be apparent from the following description of a specific embodiment of the invention, when read in conjunction with the accompanying drawing, in which:

Fig. 1 is a side elevation of apparatus for extruding plastic materials;

Fig. 2 is an enlarged, vertical section taken along line 2—2 of Fig. 1, with a diagram of an electrical circuit forming part of the apparatus shown;

Fig. 3 is an enlarged, fragmentary plan view of a portion of the apparatus shown in Fig. 1, and Fig. 4 is a complete schematic diagram of the electrical circuit forming part of the apparatus.

Referring now to Fig. 1, there is shown a conventional plastics extruding installation for the production of a plastic insulated conductor, designated generally by the numeral 10. The installation includes a supply reel 11 from which a bare electrical conductor 12 is advanced to an extruder 15. A layer of insulation 16 (Fig. 2) is applied around the conductor 12 by the extruder 15. The layer 16 may be a thermoplastic insulation, such as solid or cellular polyethylene, or the like. The bare conductor 12 is drawn through the extruder 15, and the insulated conductor 10 emerging from the extruder is drawn through a cooling trough, designated generally by the numeral 17, by a capstan 20. The insulated conductor 10 leaving the capstan 20 is wound on a take-up reel 21.

The installation thus far described is a standard one which is well known in the art. Apparatus embodying the present invention includes a channel-shaped member 22, which may be made of brass. The channel-shaped member 22 is mounted within the cooling trough 17, as shown in dotted lines in Fig. 1 and as more particularly shown in Figs. 2 and 3. The channel-shaped member 22 is secured suitably to the bottom of the cooling trough 17 and a pair of insulated spacers 25—25 are secured suitably to the bottom of the channel-shaped member 22. An electroconductive liquid 26 is introduced into the trough 17 through an inlet pipe 27 (Fig. 1) and maintained at a level above the inner channel-shaped member 22 (Fig. 3). The liquid 26 employed should be suitable to cool and solidify the insulating layer 16 and should offer some resistance to the passage of an electrical current therethrough. It has been found that ordinary tap water is sufficiently conductive to suit the purposes of capacitance sensing apparatus of this type. A suitable overflow tank 30 and an outlet pipe 31 are provided, and a recirculating system (not shown) for the liquid may be provided, if desired.

A testing electrode, designated generally by the numeral 32, is mounted within the channel-shaped member 22, and has a trough-shaped portion 35 which is integral with a flat portion 36 thereon. Suitable screws 37—37 secure the flat portion 36 of the electrode 32 to the two insulated spacers 25—25 in a position below the level of the liquid 26, as best shown in Fig. 2, so that the insulated conductor 10 is passed continuously through the trough-shaped portion 35 of the electrode 32.

Fig. 2 shows a circuit which may be used either to measure continuously the capacitance of the insulated conductor 10 or to control the extrusion operation, for example, as disclosed in Patent 2,765,441, granted October 2, 1956, on my copending application, Serial Number 378,243, filed September 3, 1953. For the purposes of the present invention, a "utilization circuit" 40 is shown across output terminals 41 and 42 of a balancing bridge designated generally by the numeral 45. It is to be understood that the utilization circuit 40 employs the output of the bridge 45 for either of the above-stated purposes, i.e., either to measure the capacitance of the insulated conductor 10 or to control the extrusion of the insulated layer 16 around the bare conductor 12.

The bridge 45 is energized by an A.C. voltage applied by an oscillator 46 across input terminals 47 and 50, the latter of which is placed at a reference potential as denoted by a ground connection. This is also the potential of the cooling trough 17, the channel-shaped member 22 and the conductor 12, the latter of which is grounded in the extruder 15. Two arms of the bridge 45 are formed by equal and fixed resistors 51 and 52, and the other two arms thereof are formed by variable resistors 55 and 56. The variable resistors 55 and 56 are connected at one of their ends to the output terminals 41 and 42, respectively, of the bridge 45, and the other ends thereof are connected together and to the grounded terminal 50. The testing electrode 32 is also directly connected to the output terminal 41. A variable capacitor 60 is connected between the output terminal 42 and ground for a purpose to be described hereinafter.

Referring to Fig. 4, which shows a complete schematic representation of apparatus embodying the invention, a capacitor 57 is shown in parallel with the variable resistor 55. The capacitor 57 has a capacitance corresponding to that formed between the grounded conductor 12 and the electrode 32 with the insulating material 16 as dielectric. Since this capacitance is continuously varying slightly as the insulated conductor 10 passes through the electrode 32, the capacitor 57 is shown in Fig. 4 to be of the variable type. The capacitor 57 is balanced in the bridge 45 by the variable capacitor 60, which is in parallel with the variable resistor 56. The variable capacitor 60 is a standard capacitor with which the capacitor 57, formed by the conductor 12 and the electrode 32, is compared.

Since the testing electrode 32 which forms the capacitor 57 with the conductor 10 is connected to the output terminal 41 of the bridge 45, a resistor 61, which corresponds to the resistance of the liquid 26, between the electrode 32 and the grounded channel-shaped member 22, is placed in parallel with the variable resistor 55 and the electrode-to-conductor capacitor 57. This resistor 61 is shown in phantom lines in Fig. 4. A capacitor 62 is shown in phantom lines to represent the shunt capacitance of the resistor 61.

It can be seen that, if a single electrode like the testing electrode 32 is employed, the resistor 61 and the capacitor 62 will cause an unbalance in the bridge 45. Since the variable resistor 55 and the resistor 61 will have to be balanced by the variable resistor 56 only, and the capacitors 57 and 62 by the variable capacitor 60 only, the resultant output of the bridge will contain not only a measurement of the capacitance between the conductor 12 and the electrode 32, but also an error, introduced therein by the resistor 61 and the capacitor 62 formed by the mounting of the electrode 32.

To compensate for this error introduced by mounting the electrode 32 within the water trough 17, a balancing electrode, designated generally by the numeral 65, is provided. The balancing electrode 65 is secured to two insulated spacers 66—66 within the channel-shaped member 22 by suitable screws 67—67. The balancing electrode 65 is of the same length and cross-sectional configuration as the electrode 32 and is placed in the channel-shaped member 22 in a direction opposite to that of the electrode 32 so that the electrodes are mounted symmetrically about the longitudinal axis of the channel-shaped member 22.

The balancing electrode 65 is connected directly to the output terminal 42 of the bridge 45. As a result, a resistor 71, corresponding to the resistance of the liquid 26 between the electrode 65 and the grounded channel-shaped member 22, and a capacitor 72, corresponding to the shunt capacitance of the resistor 71, are formed from the electrode 65 to the grounded channel-shaped member 22. This places the resistor 71 and the capacitor 72 in parallel with the variable resistor 56 and the capacitor 60, just as the resistor 61 and the capacitor 62 are in parallel with the resistor 55 and the capacitor 57.

Since the configuration of the balancing electrode 65 is the same as that of the electrode 32, the resistor 71 and the capacitor 72 will cancel any unbalance placed in the bridge 45 by the resistor 61 and the capacitor 62, respectively. Therefore, variations in the capacitor 57 will be the only element that unbalances the bridge 45, and the desired result of measuring only the capacitance between the bare conductor 12 and the electrode 32 or controlling the extruder 15 by this measured capacitance is achieved.

The channel-shaped member 22 is precision made and the electrodes 32 and 65 are mounted therein at exactly equal distances from the sides thereof. By so doing, the resistors 61 and 71 and the capacitors 62 and 72 will be exactly equal in value, since the only factors affecting the value of these components are their distances from the channel-shaped member 22 and the resistance of the liquid 26 which is constant. It can be seen, therefore, that by providing the channel-shaped member 22, the dimensions of the water trough 17 are unimportant from the standpoint of the circuit shown in Fig. 4. Consequently, a much less expensive trough 17 can be made than would be necessary if the trough itself were used as the member which formed the resistors 61 and 71 and the capacitors 62 and 72 with the electrodes 32 and 65, respectively.

The foregoing description relates primarily to the insulation of wires with polyethylene, in either solid or cellular form. However, it is obvious that apparatus embodying the invention may be used to sense the unit-length capacitance of wires insulated with other plastic insulating materials, such as polyvinyl chloride, copolymers of vinyl chloride and vinyl acetate, nylon, plasticized polystyrene, or the like, in either solid or expanded form.

Further, it will be understood that various electro-conductive liquids other than water may be utilized. As discussed hereinabove, ordinary tap water was found to be well-suited for capacitance sensing apparatus of the type used in the present invention. However, any liquid that will suitably cool and solidify the insulated layer 16, that will not chemically react with the various materials with which it comes into contact, that will leave no undesirable residue on the layer of insulation 16 and that has an effective electrical resistivity may be used. With respect to the latter requirement, it has been found that liquids having resistivities within a range of approximately 1,000 to 20,000 ohms per cubic inch are satisfactory for the purposes of this invention. If desired, these liquids may be used, not for cooling the insulated conductor 10, but for operating the capacitance sensing apparatus only.

What is claimed is:

1. Apparatus for sensing variations in electrical properties of insulation covering a conductor, which comprises an elongated container through which the conductor is passed, means for maintaining conductive fluid having an effective electrical resistance within the container and surrounding the insulated conductor, a bridge circuit including at least an unknown arm and a standard arm, a first electrode mounted within the fluid and adjacent to the path of the conductor for forming a capacitor with the conductor, wherein the covering is the dielectric thereof, and forming resistive and capacitive components with the container, the capacitor and resistive and capacitive components being connected in the unknown arms of the bridge circuit, a second electrode of a predetermined configuration mounted within the fluid and forming resistive and capacitive components with the container which are connected in the standard arm of the bridge circuit to compensate for any electrical unbalance caused by the resistive and capacitive components between the first electrode and the container, and means for causing effective potential differences to exist between the first electrode and the container and between the second electrode and the container.

2. Apparatus for sensing electrical characteristics of the dielectric on an insulated conductor, which comprises a container, a body of conductive fluid within the container having an effective electrical resistance in which the insulated conductor is immersed, a testing electrode immersed in the fluid adjacent to the conductor, a bridge circuit including at least an unknown arm and a standard arm, means for applying an alternating voltage between the testing electrode and the conductor, means for connecting the capacitance between the testing electrode and the conductor to the unknown arm of the bridge circuit, a balancing electrode immersed in the fluid adjacent to and spaced from the testing electrode for forming resistive and capacitive components with the container, means for connecting the resistive and capacitive components formed by the balancing electrode and the container to the standard arm of the bridge circuit, said balancing electrode having a configuration similar to that of the testing electrode so that the resistive and capacitive components between the balancing electrode and the container will compensate for any electrical unbalance in the bridge circuit caused by resistive and capacitive components between the testing electrode and the container, and means for causing effective potential differences to exist between the testing electrode and the container, and between the balancing electrode and the container.

3. Apparatus for sensing electrical characteristics of a plastic covered insulated conductor of indefinite length, which comprises an elongated cooling vessel containing conductive fluid having an effective electrical resistance therein, a first open-ended, trough-shaped electrode mounted in the cooling vessel and immersed in the fluid, means for continuously advancing the insulated conductor longitudinally through the first electrode, a bridge circuit including at least an unknown arm and a standard arm, means for continuously detecting the capacitance between the first electrode and successive increments of the advancing conductor passing through the electrode and forming the unknown component in the bridge circuit thereof, a second electrode mounted within the cooling vessel adjacent to and spaced from the first electrode and connected to the detecting means to form a component in the standard arm of the bridge circuit, the second electrode having a configuration similar to that of the first electrode for compensating for any electrical unbalance in the detecting means caused by the resistive and capacitive components between the first electrode and the vessel forming a component of the unknown arm of the bridge thereof, and means for causing an effective potential difference between the conductor and the first electrode, between the first electrode and the vessel and between the second electrode and the vessel.

4. Apparatus for sensing the electrical characteristics of the dielectric on an insulated conductor, which comprises an elongated metal tank provided with openings at either end through which an insulated conductor may be continuously advanced, means for maintaining conductive water having an effective resistance in the tank, a first electrode secured within the tank in the path of the insulated conductor and below the level of the water, a second electrode similar in configuration to the first electrode secured within the tank adjacent to and spaced from the first electrode, said electrodes being mounted symmetrically with respect to the longitudinal axis of the tank, a bridge circuit including a standard capacitor, means for connecting the first electrode into the bridge circuit for comparing the capacitance between the first electrode and the conductor with the capacitance of the standard capacitor, resistive and capacitive components formed between the second electrode and the metal tank, means for connecting the resistive and capacitive components formed between second electrode and the metal tank into the bridge circuit for compensating for any electrical unbalance in the bridge circuit caused by the resistive and capacitive components between the first electrode and the metal tank, and means for causing effective potential differences to exist between the conductor and the first electrode, between the first electrode and the tank and between the second electrode and the tank.

5. In apparatus for continuously monitoring electrical characteristics of the dielectric on an insulated conductor, an improved capacitance sensing apparatus, which comprises a trough, means for supplying a continuous flow of water to the trough, the water having a resistance within the range of 1,000 to 20,000 ohms per cubic inch, a channel-shaped member secured within the trough, means for connecting the conductor, the trough and the channel-shaped member to a reference potential, a first elongated electrode mounted within the channel-shaped member beneath the level of the water and designed to permit the insulated conductor to pass therethrough, a bridge circuit having input and output circuits, means for applying an energizing voltage to the input of the bridge circuit, a standard capacitance connected across a first side of the output of the bridge circuit and the reference potential, means for connecting the first electrode to the second side of the output of the bridge circuit to compare the capacitance between the first electrode and the insulated conductor with the standard capacitance, a second electrode similar to the first electrode mounted within the channel-shaped member in spaced relationship with respect to the first electrode so that the two electrodes are positioned symmetrically with respect to the longitudinal axis of the channel-shaped member, which axis extends between the two electrodes, resistive and capacitive components formed between the second electrode and the trough, and means for connecting the resistive and capacitive components formed between the second electrode and the trough to the first side of the bridge output circuit to compensate for any unbalance introduced into the bridge by the resistive and capacitive components between the first electrode and the trough.

6. Apparatus for sensing electrical characteristics of the dielectric on an insulated conductor, which comprises a vessel containing a body of conductive fluid having an effective electrical resistance, a first electrode mounted within the fluid adjacent to the conductor, a bridge circuit including at least an unknown arm and a standard arm, means for connecting the capacitance between the first electrode and the conductor and for connecting the resistive and capacitive components between the first electrode and the vessel to the unknown arm of the bridge circuit, a second electrode mounted within the fluid, means for connecting the resistive and capacitive components between the second electrode and the vessel in the standard arm of the bridge circuit to compensate for any electrical unbalance in the bridge circuitry caused by the resistive and capacitive components between the first electrode and the vessel, and means for causing effective potential differences to exist between the conductor and the first electrode, between the first electrode and the vessel and between the second electrode and the vessel.

7. Apparatus for sensing electrical characteristics of the dielectric on an insulated conductor, which comprises a vessel containing a body of conductive fluid having an effective electrical resistance in which the insulated conductor is immersed, a bridge circuit including at least an unknown arm and a standard arm, a testing electrode immersed in the fluid adjacent to the conductor for forming a capacitor with the conductor, wherein the insulation is the dielectric thereof, which is connected to the unknown arm of the bridge circuit, a balancing electrode mounted within the fluid adjacent to and spaced from the testing electrode for forming resistive and capacitive components with the vessel which are connected across the standard arm of the bridge circuit, the balancing electrode having a configuration similar to that of the testing electrode so as to compensate for any electrical unbalance caused by the capacitive and resistive components between the first electrode and the vessel, and means for causing effective potential differences to exist between the conductor and the first electrode, between the first electrode and the vessel and between the second electrode and the vessel.

8. Apparatus for sensing electrical characteristics of the dielectric on an insulated conductor of indefinite length, which comprises an elongated cooling trough containing conductive water having an effective electrical resistance therein, a first open-ended, trough-shaped electrode mounted in the cooling trough and submerged in the water, means for continuously advancing the insulated conductor longitudinally through the first electrode, a second electrode mounted within the cooling trough adjacent to and spaced from the first electrode, the second electrode having a configuration similar to that of the first electrode and forming resistive and capacitive components with the cooling trough which may be used to compensate for any electrical unbalance caused by the capacitive and resistive components between the first electrode and the cooling trough, means for causing effective potential differences to exist between the conductor and the cooling trough and for maintaining a charge on the second electrode, means for detecting the capacitance between the conductor and the first electrode and the unbalance between the first electrode and the cooling trough, and means for detecting the resistive and capacitive components between the second electrode and the cooling trough.

9. Apparatus for sensing electrical characteristics of the dielectric on an insulated conductor, which comprises an elongated vessel through which an insulated conductor may be advanced continuously, means for maintaining a conductive fluid having an effective electrical resistance in the vessel, a first electrode secured within the vessel adjacent to the path of the insulated conductor and immersed in the fluid, and a second electrode similar in configuration to the first electrode secured within the vessel such that the electrodes are mounted in spaced relationship and symmetrically with respect to the longitudinal axis of the vessel which extends therebetween, means for causing effective potential differences to exist between the conductor and the first electrode, for causing the same effective potential to exist on both the first and the second electrodes and for causing a potential difference to exist between the electrodes and the vessel, means for detecting the resistive and capacitive components between the first electrode and the vessel plus the capacitive component between the first electrode and the conductor, and means for detecting the capacitive and resistive components between the second electrode and the vessel which may be utilized to cancel the effect of the resistive and capacitive components between the first electrode and the vessel to obtain the value of the capacitance component between the first electrode and the conductors.

References Cited in the file of this patent

UNITED STATES PATENTS

| | | |
|---|---|---|
| 2,238,610 | Thomas | Apr. 15, 1941 |
| 2,274,735 | Peters et al. | Mar. 3, 1942 |
| 2,617,299 | Ennis | Nov. 11, 1952 |
| 2,804,592 | Briskeborn | Aug. 27, 1957 |